April 25, 1961 R. E. BROWN 2,981,119
VARIABLE SPEED TRANSMISSION
Filed Sept. 28, 1959 4 Sheets-Sheet 3
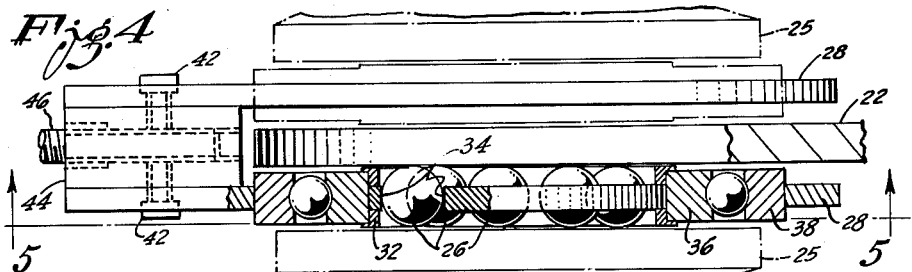
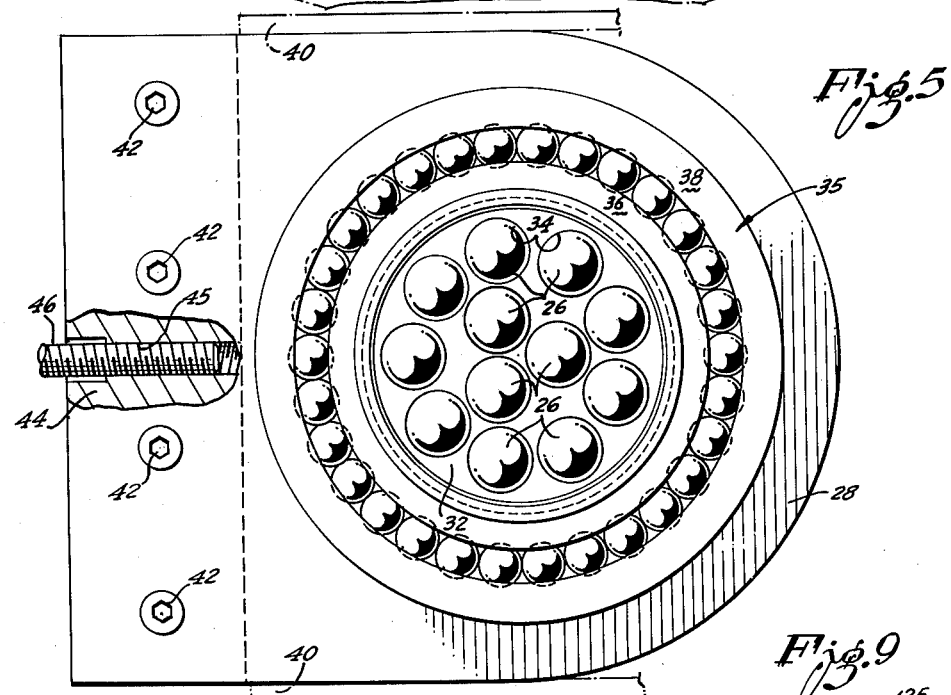
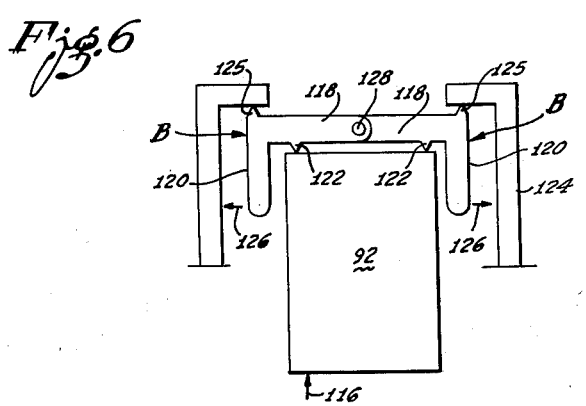
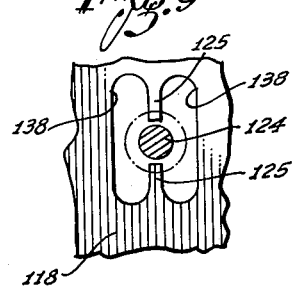
INVENTOR:
Ralph E. Brown
By Smyth & Roston
Attorneys April 25, 1961   R. E. BROWN   2,981,119
VARIABLE SPEED TRANSMISSION
Filed Sept. 28, 1959   4 Sheets-Sheet 4
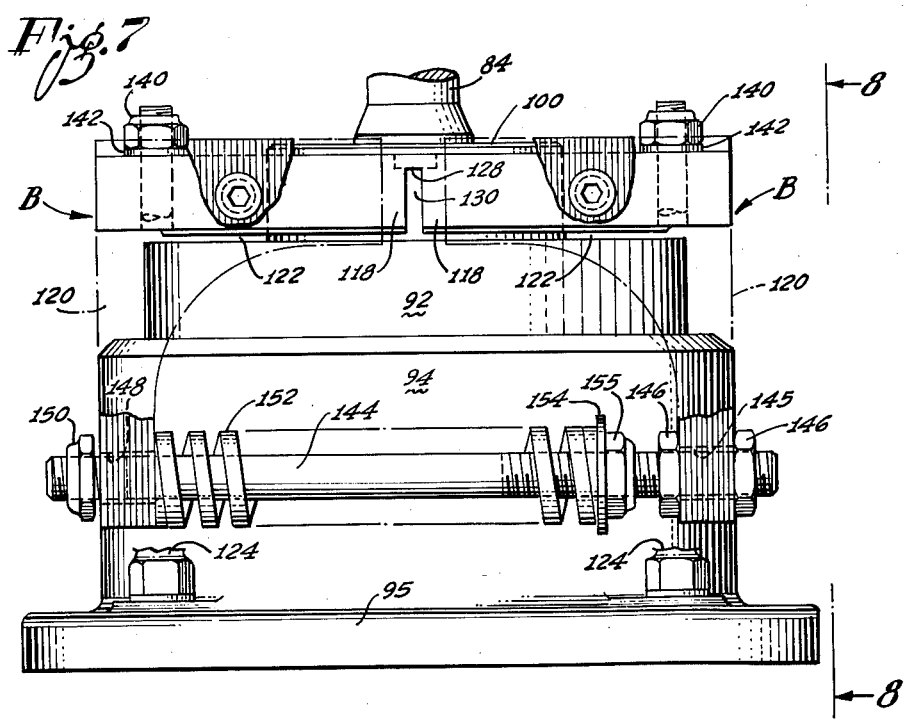
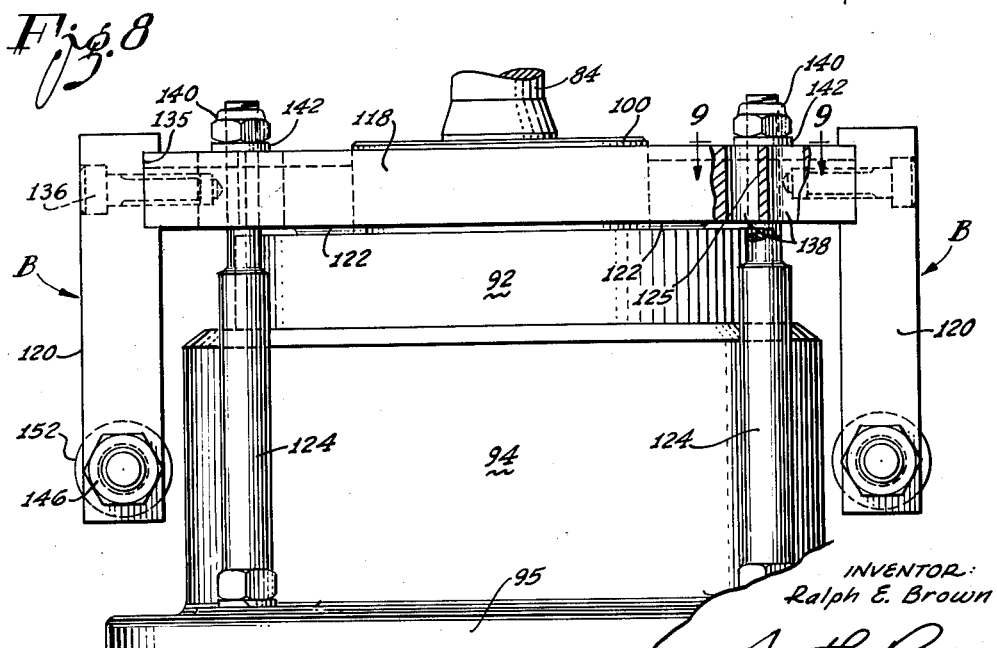
INVENTOR:
Ralph E. Brown
By Smyth & Roston
Attorneys

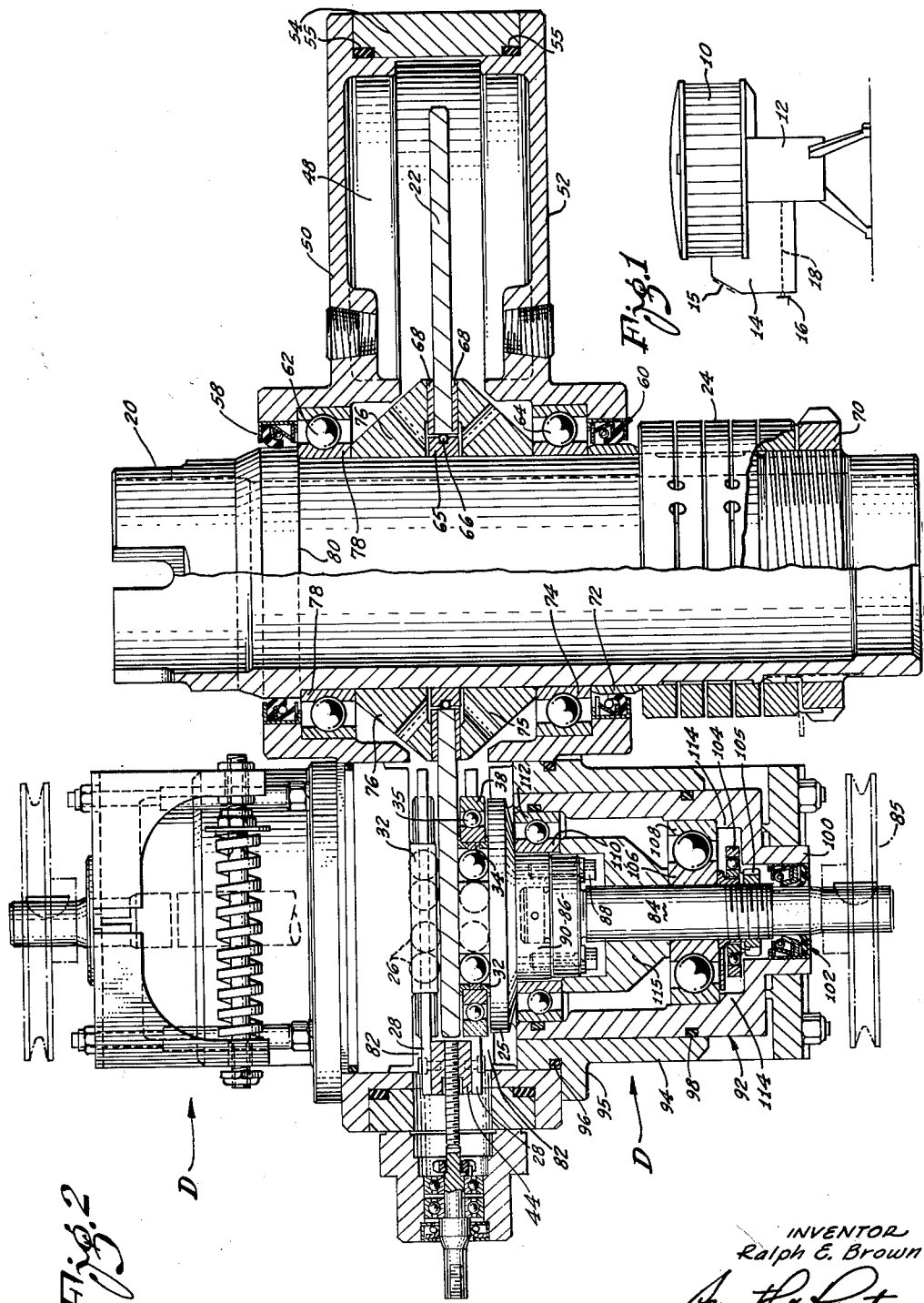

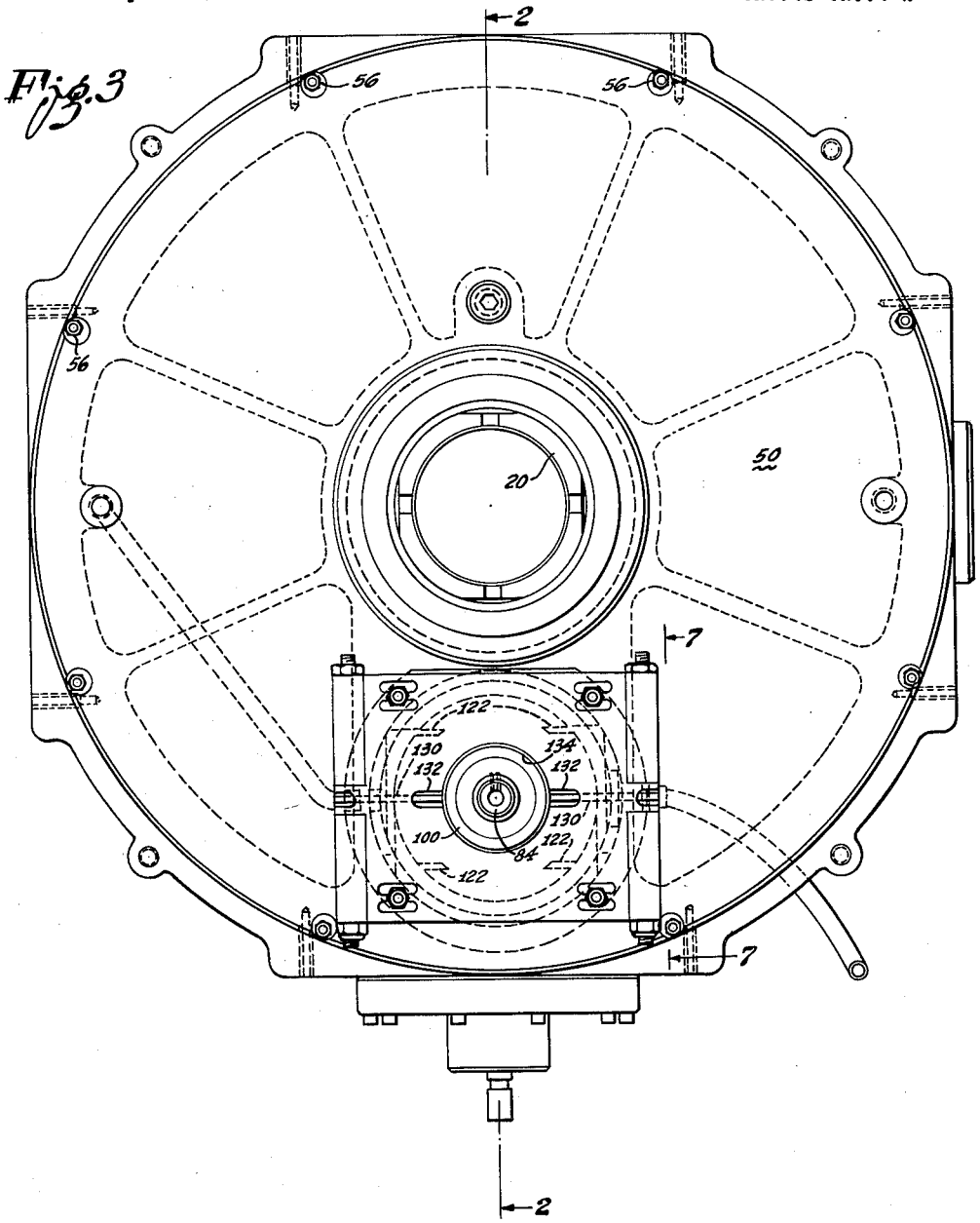

United States Patent Office 2,981,119
Patented Apr. 25, 1961

2,981,119

VARIABLE SPEED TRANSMISSION

Ralph E. Brown, Los Angeles, Calif., assignor to Genisco, Incorporated, Los Angeles, Calif., a corporation of California Filed Sept. 28, 1959, Ser. No. 842,768

15 Claims. (Cl. 74—198)

This invention relates to a variable speed ball-and-disc transmission of the type wherein a cluster of balls is interposed between a drive disc and a driven disc for torque transmission and is shiftable along a radius of one of the two discs for changes in speed of the driven disc. Such a transmission is disclosed in the William S. Rouverol application, Serial No. 611,485, entitled "Variable Speed Transmission" filed September 24, 1956, and now Patent No. 2,951,384.

The invention is directed to the solution of certain problems arising in the practical development of a transmission of this multiple ball type.

One of these problems is to achieve exceptionally high torque transmission. A second and related problem is to place the balls under pressure as required for high torque transmission without creating unbalance, undue stress or other undesirable effects in reaction to the applied pressure.

These two problems are solved by a combination of a drive means and a driven means in which one of the two means is a single disc and the other of the two means is a pair of coaxial discs on opposite sides of the single disc with clusters of balls between the single disc and the two coaxial discs respectively. The use of the two clusters of balls doubles the transmitted torque. Since the two coaxial discs are subjected to substantially the same magnitude of pressure, the two oppositely applied pressures balance each other and thus avoid placing the interposed single disc under flexural stress.

Another problem is to prevent skidding of the torque transmitting balls in response to an excessive rise in the load on the driven means. To meet this problem the invention includes a torque-responsive clutch between the driven means and the load, which clutch slips at a torque less than the total torque transmitting capacity of the balls.

A further problem is to provide a variable speed transmission of the present type in which the output speed varies in a linear manner in response to radial shift in the position of a cluster of the torque transmitting balls. The invention solves this problem by a new geometrical arrangement in which a relatively small disc is positioned entirely within the radial dimension of a larger disc, and in which a cluster of balls that is smaller in diameter than the smaller disc is interposed between the two discs. The axis of the smaller disc intersects a given radius of the larger disc and the cluster of balls has a range of movement along this radius, the range lying between the axis of the smaller disc and the circumference or periphery of the larger disc. Shift of the cluster of balls within this outer range causes substantially linear change in the r.p.m. output.

A still further problem is to apply pressure to the smaller disc for pressing the cluster of balls against the larger disc with uniform pressure distribution among the balls throughout the range of shift of the cluster relative to the smaller disc. The requirement is that the smaller disc exert pressure against the cluster of balls with no tendency for the smaller disc to tilt in response to shift of the cluster radially of the smaller disc.

This last problem is met by mounting the smaller disc in a journal means that is free to move along the axis of the smaller disc and by further providing a pair of means on pivot axes on opposite sides of the journal means, the two pivoted means extending towards each other across the journal means. The two pivoted means make fulcrum contact with spaced points of the journal means on opposite sides of its axis and suitable spring means urges the two pivoted means towards the journal means to transmit pressure thereto at the spaced fulcrum points. Uniform pressure distribution among the balls of the cluster is achieved by operatively interconnecting the two pivoted means for synchronous movement, which synchronous movement maintains the fulcrum contact points in common planes normal to the axis of the journal means. In the preferred practice of the invention there are four circumferentially spaced fulcrum contact points and the two pivoted means are adjustable for initially placing the four fulcrum contact points in a common plane normal to the axis of the journal means.

The invention has been initially embodied in a speed reducing transmission for a precision centrifuge machine. This initial embodiment of the invention has been selected for the present disclosure and will provide adequate guidance for those skilled in the art who may have occasion to employ the same principles in other speed reducing and speed increasing transmissions.

The various features and advantages of the invention may be understood from the following detailed description and the accompanying drawings.

In the drawings, which are to be regarded as merely illustrative:

Fig. 1 is a side elevational view of a precision centrifuge machine incorporating the selected embodiment of the invention;

Fig. 2 is a cross-sectional view on a larger scale, with parts in side elevation, showing the structural arrangement of the transmission, the section being taken along the line 2—2 of Fig. 3;

Fig. 3 is a plan view of the structure shown in Fig. 2;

Fig. 4 is a fragmentary view partly in side elevation and partly in section showing the two clusters of balls on opposite sides of the single disc;

Fig. 5 is a plan view of the structure as seen along the line 5—5 of Fig. 4;

Fig. 6 is a diagram illustrating the principle employed for placing the balls of a cluster under uniform pressure regardless of the degree to which the cluster of balls is shifted relative to the associated pressure-applying disc;

Fig. 7 is a side elevation on an enlarged scale of one of the pressure-applying mechanisms, the mechanisms being viewed along the line 7—7 of Fig. 3, portions of the structure being broken away;

Fig. 8 is a similar elevational view of the same structure as seen along the line 8—8 of Fig. 7; and Fig. 9 is an enlarged fragmentary section taken along the line 9—9 of Fig. 8, the view showing a fulcrum structure.

General arrangement

Fig. 1 shows a precision centrifuge machine incorporating the present embodiment of the invention. The turntable proper for testing instruments and various devices is concealed in a cylindrical housing 10 and is driven by an upright shaft in a lower pedestal housing 12. A control housing 14 extending to one side of the apparatus has a control panel 15 and is provided with a manually operable crank 16. The crank 16 is on the outer end of a control shaft 18 for controlling the speed adjustment of the transmission of the present invention which transmission is concealed inside the pedestal housing 12. Devices under test on the turntable may be electrically connected with instruments on the control panel 15, slip rings being provided on the turntable shaft for this purpose. Suitable power means (not shown) such as an electric motor or a combination of an electrically actuated pump and a fluid motor is provided in the control housing 14 for driving the turntable through the variable speed transmission.

The principal parts of the transmission are shown in Fig. 2.

An upright driven shaft 20 is of tubular construction to receive telescopically the shaft (not shown) to which the turntable is directly connected. This construction makes it possible to employ a turntable shaft that is equipped with the necessary slip rings and wiring, which shaft together with the slip rings and associated wiring may be removed as a unit from the tubular shaft 20.

The driven shaft 20 is actuated by a relatively large driven disc 22 which surrounds the shaft and is operatively connected with the shaft by a suitable friction clutch including a heavy clutch spring 24. The driven disc 22 normally drives the shaft 20 without slippage but slips whenever the load imposed on the shaft exceeds some predetermined magnitude which is less than the torque capacity of the torque transmitting balls of the transmission. This arrangement prevents damaging skidding of the balls in the event of overload.

There are two identical drive units on opposite sides of the driven disc 22, each of which is generally designated by the letter D. Each of the two drive units D comprises essentially a power actuated drive disc 25, a cluster of torque transmitting balls 26, a carriage 28 in which the cluster of balls is mounted, and suitable means to press the drive disc 25 towards the driven disc 22 to place the cluster of balls under compression. Each of the clusters of hard metal balls 26 is confined by a circular cage 32, which cage may comprise simply a machined thick metal plate with numerous circular apertures 34 (Fig. 5) to confine the individual balls.

Referring to Figs. 2, 4 and 5, each of the carriages 28 comprises a relatively thin metal plate in which the corresponding circular cage 32 is mounted by a ball bearing 35. The inner race 36 of the ball bearing embraces the circular cage 32 and the outer race 38 is fixedly embraced by the carriage plate. Each of the two carriages 28 is slidingly confined by a pair of parallel guideways 40 to restrict the movement of the carriage accurately to a radius of the driven disc 22 that intersects the axis of the drive disc 25, the axis of the circular cage 32 being on this radius throughout the range of adjustment of the carriage.

The two carriage plates 28 are elongated to extend beyond the corresponding drive discs 25 throughout their ranges of adjustment and the outer ends of the two carriage plates are interconnected for synchronous control. In the construction shown the outer end portions of the carriage plates 28 are attached by screws 42 to an interposed metal block 44 which is provided with a screw threaded bore 45. A control screw 46 shown in Figs. 2 and 5 is adapted for connection to the previously mentioned control shaft 18 for actuation by the previously mentioned crank 16. Thus rotation of the crank 16 causes simultaneous shift of the two carriage plates 28 by screw action to vary the rate at which the driven disc 22 is actuated by the two drive discs 25 through the medium of the two clusters of balls 26.

Operation

When the two circular ball cages 32 are at their zero positions coaxially of the two drive discs 25, the balls 26 merely roll in circular orbits with the circular cages rotating at half the speed of the two drive discs 25 and no torque is transmitted to the driven disc 22. Outward displacement of the two circular cages 32 away from the axis of the two drive discs 25 along the previously mentioned radius of the driven disc 22 causes the two clusters of balls 26 to impart rotation to the driven disc. In this particular embodiment of the invention, for example, the range of radial shift of the two circular cages 32 is approximately 1⅛ inch and at the outermost limit adjustment of the two circular cages for the maximum rate of rotation of the turntable the driven disc 22 rotates at 1/6.25 times the speed of rotation of the two drive discs 25.

Since each of the balls 26 transmits torque to the driven disc 22, the torque is multiplied by the number of balls in each of the circular cages 32 and is doubled by the use of two clusters of balls on the opposite sides of the driven disc. The total transmitted torque in this instance is 850 inch lbs. regardless of the speed at which the driven disc is rotated. It may be readily appreciated that with two clusters of torque-transmitting balls on opposite sides of the driven disc 22, the driven disc is under balanced pressure, the pressures exerted by the two drive discs 25 being equal and opposite.

When the two circular cages 32 are shifted outward for increase in the rate of rotation of the driven disc 22, two radii increase simultaneously, one radius being the distance from the axis of the drive discs 25 to the axis of the circular cages, the other radius being the distance from the axis of the driven disc 22 to the axis of the circular cages. One important advantage of this geometry is that the two radii increase at different rates to make the r.p.m. output of the driven disc 22 substantially linear. A second important advantage is that the driving arm or moment applied to the driven disc 22 increases with increased speed adjustment. The longer driving arm with the consequent higher torque is desirable at the higher output speeds.

This embodiment of the invention functions as a speed reducing transmission but it is apparent that the arrangement can be reversed to function as a speed increasing transmission. Thus with the driven disc 22 actuated to serve as a drive disc, the two smaller discs 25 will be driven at higher rotational speeds than the disc 22. The step up in speed may be 20 to 1, for example. In such a reversed arrangement, however, stop means must be provided to keep the two circular cages 32 from being moved into coaxial relation with the two smaller discs 25.

Structural details

The driven disc 22 and the two drive discs 25 together with the two clusters of balls 26 operate in an oil filled chamber 48 that is circular in plan. In the construction shown, the chamber 48 is formed by an upper housing wall member 50 of circular configuration, a lower housing wall member 52 of the same configuration and a cylindrical wall member 54 which is grooved to receive a pair of sealing rings 55. These three wall members may be interconnected by suitable screws 56 as indicated in Fig. 3. The upper wall member 50 has a central opening to clear the driven shaft 20 and this opening is provided with an annular sealing assembly 58. In like manner, the lower wall member 52 has a central opening provided with a second sealing assembly 60.

The driven shaft 20 is journaled in the described housing structure by an upper ball bearing 62 and a lower ball bearing 64. The driven disc 22 which normally rotates with the driven shaft 20 surrounds a bearing collar 65 on the driven shaft in contact with small bearing balls 66 in an outer circumferential groove of the bearing collar. The driven disc 22 is sandwiched between a pair of rings 68 of clutch liner material which are placed under compression by the previously mentioned clutch spring 24.

The clutch spring 24 is confined between an adjustment nut 70 on the driven shaft 20 and a spacer collar 72 that presses against the inner race 74 of the lower ball bearing 64. The inner race 74 abuts a conical pressure collar 75 that presses against the lower clutch liner ring 68. A second conical pressure collar 76 in contact with the upper clutch liner ring 68 abuts the inner race 78 of the upper ball bearing 62 and this inner race, in turn, abuts a circumferential shoulder 80 formed by an enlargement of the driven shaft 20.

It is apparent that the spring 24 in cooperation with the circumferential shoulder 80 and the two pressure collars 75 and 76 clamps the driven disc 22 under pressure between the two clutch liner rings 68. It is a simple matter to adjust the nut 70 to cause the driven disc 22 to slip relatively to the driven shaft 20 at a torque load that is under the maximum torque that can be transmitted through the two clusters of balls 26.

The two drive units D are mounted in circular openings 82 in the upper and lower housing wall members 50 and 52, respectively. Each drive unit includes a drive shaft 84 that carries a drive sheave 85 on its outer end and is formed with an enlargement 86 on its inner end. The enlargement 86 of each of the drive shafts is connected by screws 88 with a hub 90 of the corresponding drive disc 25. The two drive sheaves 85 are operated in unison by a common power source.

Each of the two drive shafts 84 is mounted in a journal means in the form of a cylindrical casing 92 and this journal casing, in turn, is slidingly mounted in a guide cylinder 94. The guide cylinder 94, which is secured by suitable screws (not shown), is formed with a base flange 95. The guide cylinder is sealed in the circular opening 82 by an O-ring 96 and the journal casing 92 is slidingly sealed in the guide cylinder by an O-ring 98.

Each drive shaft 84 extends through an opening formed by a cylindrical flange 100 in the wall of the journal casing 92 and is sealed in the opening by an annular sealing assembly 102. Just inside the opening in the journal casing, the drive shaft carries a small eccentrically mounted ball bearing 104 secured by a nut 105. The eccentric ball bearing actuates a lubrication pump which is not a part of the present invention and need not be described.

The drive shaft 84 is journaled in the journal casing 92 by a first ball bearing having an inner race 106 and an outer race 108 and by a second ball bearing having an inner race 110 and an outer race 112. The outer race 108 of the first ball bearing is placed under pressure by an abutting inner circumferential shoulder 114 of the journal casing and transmits this axial pressure to the inner race 106. The inner race 106 abuts a pressure collar 115 which acts through the inner race 110 of the second ball bearing to place the drive disc 25 under axial pressure against the corresponding cluster of balls 26. The outer race 112 of the second ball bearing is slidingly mounted in the journal casing 92 to give the inner race 110 freedom for the required transmission of axial pressure to the drive disc.

As heretofore stated, the problem arises of maintaining all of the balls 26 of a cluster under uniform pressure when the cluster is shifted radially away from coaxial relation with the corresponding drive disc 25. The principles used in the solution of this problem may be understood by reference to the diagram in Fig. 6 where the journal casing 92 is represented by a rectangle and the axis of a radially displaced cluster of balls 26 is represented by an arrow 116.

Two links 118 extend across the outer end of the casing from opposite sides to transmit pressure thereto and in this instance the two links 118 are arms of corresponding bell cranks each of which is generally designated B. The two arms 118 of the two bell cranks B extend horizontally over the end of the journal casing 92 and the second arms 120 of the bell crank extend vertically along the sides of the journal casing. Each of the two bell cranks B makes fulcrum contact with the outer end of the journal casing 92 and for this purpose is formed with a downwardly directed fulcrum portion 122. Each of the bell cranks B is positioned adjacent a fixed support 124 and makes fulcrum contact with an overhanging portion of the fixed support, by means of an upwardly directed fulcrum portion 125 of the bell crank.

The two vertically extending arms 120 of the two bell cranks B are subjected to outward spring pressure as indicated by the two arrows 126. Thus with the upper fulcrum portions 125 of the two bell cranks B acting against the fixed supports 124, it is apparent that the spring pressure is transmitted to the outer end of the journal casing 92 by the inner fulcrum portions 122. Uniform distribution of the pressure against the eccentrically positioned ball cluster represented by the arrow 116 is accomplished by operatively interconnecting the two bell cranks B for synchronous operation. For this purpose the two bell cranks B are shown diagrammatically as interconnected by pivot means 128 at the outer ends of the two arms 118.

It is apparent that regardless of how far off-center may be the ball cluster represented by the arrow 116, the two inner fulcrum portions 122 that apply the required pressure to the journal casing 92 are always aligned with each other in a plane perpendicular to the axis of the journal casing. Thus any tendency for either of the two inner fulcrum portions 122 to advance or retreat is transmitted to the other fulcrum portion by the pivotal connection 128 between the two bell cranks B, force being freely transmitted from one bell crank to the other as required by various off-center positions of the cluster of balls.

The manner in which the relationships shown in Fig. 6 are incorporated in each of the drive units D in the present embodiment of the invention may be understood by referring to Figs. 7 and 8.

For balanced application of pressure against the outer end of each journal casing 92, a pair of bell cranks B is employed. The horizontal arm 118 of each of the bell cranks B is a relatively wide plate having two laterally spaced inner fulcrum portions 122 in the form of short ribs, the two bell cranks providing four symmetrically distributed fulcrum ribs. In the construction shown, the two horizontal arms 118 of the two bell cranks B are integral portions of a single thick plate of metal that is suitably weakened along a central dividing line to provide a flexural connection between the two arms, which flexural connection is equivalent to the pivotal connection 128 in Fig. 6. As indicated in Figs. 3 and 7, the metal plate may be weakened along this line on its underside by a groove 130 and may be further weakened by a pair of slots 132 that are cut completely through the plate. The two slots 132 extend in diametrically opposite directions from a circular opening 134 in the plate that surrounds the cylindrical flange 100 of the journal casing 92. As indicated in Fig. 7, the result is a flexural connection 128 of relatively thin metal.

Each of the two bell cranks B has a pair of laterally spaced parallel vertically extending arms 120 the two laterally spaced arms being on opposite sides of the guide cylinder 94. Each of the two laterally spaced arms 120 is in the form of a metal block that is formed with a wide groove 135 (Fig. 8) to receive the edge of the metal plate of the bell crank, the metal block being secured by screws 136.

The fixed support means 124 of the diagram in Fig. 6, comprises studs 124 in Figs. 7 and 8 which are mounted at their base ends on the base flange 95 of the guide cylinder 94. There are two laterally spaced studs 124 for fulcrum contact with each of the two bell cranks B. To receive the two studs 124 each of the plates that form the two bell crank arms 118 is cut away as indicated in Fig. 9. Fig. 9 shows a pair of closely spaced slots 138 in the plate material of a bell crank arm 118 which slots form an intervening thin web and this web is cut away centrally to provide a pair of fulcrum portions 125 in the form of metal fins that extend to diametrically opposite sides of the corresponding stud 124. As shown in Figs. 7 and 8 the outer end of each stud 124 is provided with a nut 140 and a washer 142, the washer being free to rock on the fins 125 for the required fulcrum action.

As may be seen in Fig. 8 the four arms 120 of the two bell cranks B protrude beyond the diameter of the guide cylinder 94, there being a pair of arms 120 of the two bell cranks, respectively, on each of the two opposite sides of the guide cylinder. The paired arms 120 of the two bell cranks are interconnected on each side of the guide cylinder by a spring assembly that is best shown in Fig. 7.

The spring assembly that interconnects two paired arms 120 of the two bell cranks B includes a threaded rod 144 which extends through a bore 145 of one of the paired arms 120 and is anchored relative to the arm by a pair of nuts 146. The other end of the threaded rod 144 extends loosely through an oversize bore 148 in the other paired bell crank arm 120. The second end of the threaded rod 144 carries a nut 150 that is normally spaced from the outer side of the second bell crank arm 120. A heavy coil spring 152 surrounds the threaded rod 144 in compression between the second bell crank arm 120 and a washer 154 on the threaded rod that is backed by a suitable nut 155. It is apparent that the coil spring 152 urges the two bell crank arms 120 apart to provide the spring force that is represented by the two arrows 126 in the diagram of Fig. 6.

The initial "leveling" of the two journal casings 92 is accomplished by adjustment of the four nuts 140 on the outer ends of the studs 124. These nuts are adjusted to place the four inner fulcrum ribs 122 in a common plane that is precisely perpendicular to the axis of the corresponding drive disc 25. Whenever it is desired to remove the pressure against the outer end of the journal casing 92, the two nuts 150 are tightened against the corresponding arms 120 of the two bell cranks B. The tightening of the two nuts 150 draws the paired bell crank arms 120 toward each other to retract the four fulcrum ribs 122 of the bell crank and thus permits the journal casing 92 to be retracted sufficiently for the withdrawal of the corresponding cluster of balls 26.

My description in specific detail of the selected embodiment of the invention will suggest various changes, substitutions and other departures from my disclosure within the spirit and scope of the appended claims.

I claim:

1. A power transmission comprising: a drive disc; a driven disc, one of said two discs being of less than half the diameter of the other disc and being positioned wholly within the circumference of the other disc with its axis on a given radius from the axis of the other disc; a plurality of balls interposed between the two discs in tangential rolling contact with both discs; and a rotary cage maintaining the balls in a cluster substantially smaller in diameter than the smaller disc and wholly within the circumference of the smaller disc, said rotary cage having its axis of rotation on said given radius; and control means to shift said rotary cage along said given radius within the circumference of the smaller disc to vary the speed ratio between the two discs.

2. A combination as set forth in claim 1 which includes means including a yielding clutch to connect said driven disc to a load, said clutch having a maximum torque transmitting capacity less than the torque transmitting capacity of the cluster of ball whereby the clutch yields to an excessive load to prevent skidding of the balls.

3. A power transmission including: a drive means; a driven means, one of said means comprising a relatively large disc, the other of said means comprising two coaxial discs on opposite sides of said large disc, said two coaxial discs being of less than half the diameter of the large disc and being positioned wholly within the circumference of the large disc with their common axis on a given radius from the axis of the large disc; two concentric clusters of balls centered on said radius under compression between said large disc and said two coaxial discs, respectively, for transmitting torque between the large disc and the two coaxial discs, said clusters being substantially smaller in diameter than the coaxial discs; two concentric rotary cages confining the two clusters, respectively, each of said cages having its axis of rotation substantially on said given radius; and control means to shift said two rotary cages simultaneously substantially along said given radius to vary the speed ratio between the large disc and the two coaxial discs.

4. A combination as set forth in claim 3 in which said control means includes: two carriage means surrounding said two cages respectively; bearing means surrounding each of said two cages to journal the cage in the corresponding carriage means; means to shift said two carriage means synchronously; and guide means to confine the movements of the two carriages to said given radius.

5. A speed reducing power transmission comprising: a driven shaft; a driven disc frictionally mounted on said driven shaft to slip relative thereto when the torque between the driven disc and the driven shaft reaches a given magnitude; a pair of coaxial drive discs on opposite sides of said driven disc, each drive disc being smaller than the radial dimension of the driven disc and being located on a given radius of the driven disc within the circumference of the driven disc; two concentric clusters of balls centered on said radius under compression between said driven disc and said two coaxial drive discs, respectively, for transmitting torque from the two drive discs to the driven disc, each of said clusters being substantially smaller in diameter than the coaxial drive discs; and means to shift said clusters along said radius synchronously to vary the speed of the driven disc.

6. A combination as set forth in claim 5 in which said driven disc is sandwiched between a pair of friction rings on the driven shaft and which includes a spring means surrounding said driven shaft and placing said friction rings under pressure for frictionally connecting the driven disc with the driven shaft.

7. A power transmission including: a relatively large disc; a relatively small disc positioned adjacent one face of the large disc entirely within the radial dimension of the large disc; a cluster of balls interposed between the two discs for transmitting torque between the two discs, all of the balls of the cluster being in a common plane that is parallel to said large disc, said cluster being of a diameter smaller than the small disc and being positioned with its axis on a radius of the large disc that intersects the axis of the small disc; means to confine the shifting of said cluster to said radius; and speed control means to shift said cluster along said radius in a range extending outwardly from the axis of the small disc whereby such shift produces substantially linear changes in the output speed of the transmission.

8. In a ball-disc transmission wherein a cluster of torque transmitting balls interposed between a first disc and a second disc is movable along a radius of the first disc, means to place the balls of said cluster under substantially uniform pressure throughout the range of eccentricity of the cluster relative to the first disc, said pressure means including: a casing journaling said first disc; means to guide said casing along the axis of the first disc; a pair of pivoted means extending from their pivot axes inward over the outer end of said casing from opposite sides thereof and having fulcrum portions in contact with the casing at points on opposite sides of the axis of the casing; and means to apply force to said pivoted means to urge the pivoted means towards said casing thereby to apply pressure to the casing at said points of fulcrum contact, said pair of pivoted means being operatively interconnected for synchronous movement of their fulcrum portions relative to the casing.

9. A pressure means as set forth in claim 8 which includes a pair of bell cranks each having two arms forming an angle, one of the two arms of each bell crank being one of said pair of pivoted means; and in which said means to apply force to the pivoted means is spring means under stress between the second arms of the two bell cranks.

10. A combination as set forth in claim 9 which includes a rod connected to one of said second arms and extending towards the other second arm, said rod being provided with a shoulder; and in which said spring means is a coil spring surrounding said rod under compression between said shoulder and said other second arm to urge said second arms away from each other thereby to place said casing under pressure.

11. A combination as set forth in claim 10 which includes means to interconnect said rod and said other second arm to draw said other second arm towards said shoulder thereby to compress the spring and remove the pressure from the casing.

12. In a ball-disc transmission wherein a cluster of torque transmitting balls interposed between a first disc and a second disc is movable along a radius of the first disc, means to place the balls of said cluster under substantially uniform pressure throughout the range of eccentricity of the cluster relative to the first disc, said pressure means including: a casing journaling said first disc; means to guide said casing along the axis of the first disc; two wide bell cranks on fixed pivot axes on opposite sides of a diameter of the casing, each having a first arm extending from the bell crank axis over the outer end of the casing and having a second arm in the form of two laterally spaced portions at an angle to said first arm extending longitudinally of said casing and protruding from opposite sides of the casing with two of the protruding portions of the two bell cranks respectively paired on opposite sides of the casing, said first arm of each bell crank making fulcrum contact with said casing at laterally spaced points, said two bell cranks being operatively interconnected for synchronous movement to maintain said points of fulcrum contact in planes normal to the axis of said casing; and two spring means under compression between said paired protruding portions respectively of the two bell cranks to create pressure at said points of fulcrum contact.

13. A combination as set forth in claim 12 in which the pivot axes of said two bell cranks are adjustable relative to said support structure to place said fulcrum points in a common plane normal to the axis of the first disc.

14. A combination as set forth in claim 12 which includes four fixed supports, two for each of said bell cranks in pivotal contact with the bell crank to provide the pivot axis for the bell crank, each of said four fixed supports being adjustable to place all of said points of fulcrum contact in a common plane normal to the axis of the first disc.

15. A combination as set forth in claim 12 in which the adjacent ends of said first arms of the two bell cranks are interconnected for synchronous movement of the two bell cranks.

References Cited in the file of this patent
UNITED STATES PATENTS

| | | |
|---|---|---|
| 2,422,306 | Laing | June 17, 1947 |
| 2,490,525 | Koller | Dec. 6, 1949 |
| 2,873,911 | Perrine | Feb. 17, 1959 |